March 23, 1943.   G. H. BURRELL   2,314,767
ADJUSTABLE RUBBER VALVE
Filed March 18, 1942
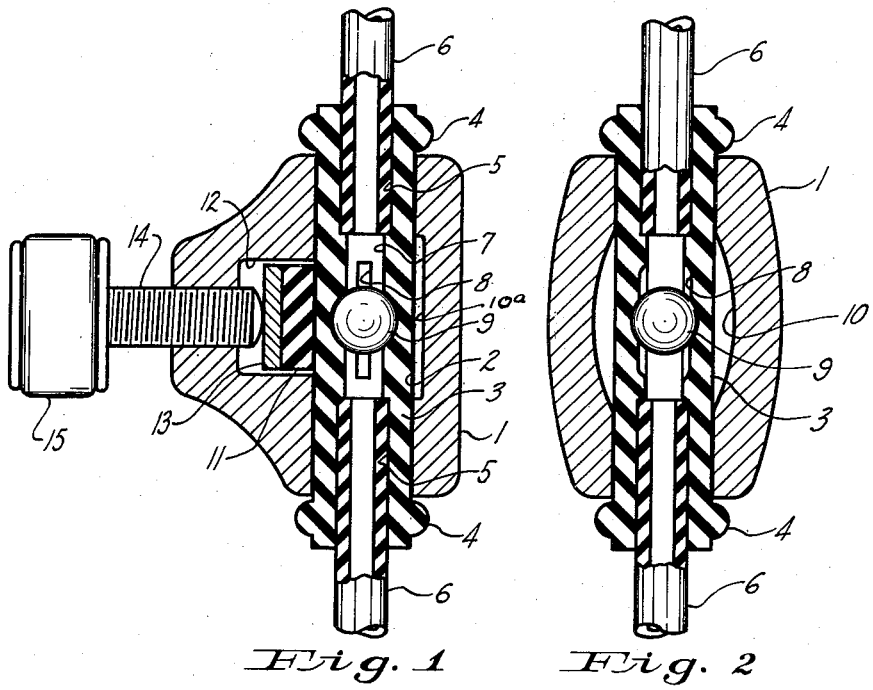
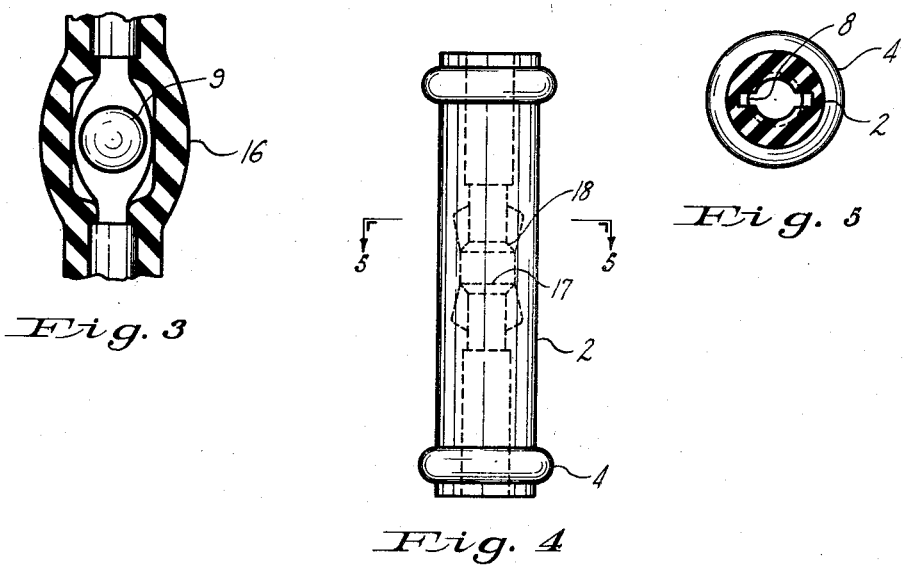
INVENTOR.
Guy H. Burrell
BY William B. Jaspert
Attorney Patented Mar. 23, 1943

2,314,767

UNITED STATES PATENT OFFICE 2,314,767

ADJUSTABLE RUBBER VALVE

Guy H. Burrell, Mount Lebanon, Pa., assignor to Burrell Technical Supply Company, Pittsburgh, Pa., a corporation of Pennsylvania Application March 18, 1942, Serial No. 435,161

4 Claims. (Cl. 251—122)

This invention relates to new and useful improvements in flow control valves for use in gas or liquid systems, and it is among the objects thereof to provide a valve structure that is non-fragile, of simple, compact and durable construction, and which shall be capable of maintaining a controlled gas or liquid flow.

A further object of the invention is the provision of a valve of the above-designated character which shall be self-clearing of particles entrained in the gas or liquid flowing therethrough.

The invention will become more apparent from a consideration of the accompanying drawing constituting a part hereof in which like reference characters designate like parts and in which:

Fig. 1 is a vertical cross-sectional view of a valve embodying the principles of this invention;

Fig. 2 a similar view taken at right angles to the view of Fig. 1;

Fig. 3 a cross-sectional view of the center of the rubber part expanded to open flow position;

Fig. 4 a side elevational view of the molded rubber part only; and

Fig. 5 a cross-section taken along the line 5—5, Fig. 4.

In the drawing, the numeral 1 designates a housing of aluminum alloy or any other suitable, durable, lightweight material, such as a plastic having a cylindrical bore 2 for receiving a molded rubber valve body 3 having outer rings 4 at the top and bottom to secure the valve in position in the housing 1.

Opposite ends of the valve are provided with enlarged openings 5 for receiving the ends 6 of glass or other tubing through which the gas or liquid is conducted to and from the valve.

The constricted center portion 7 of the rubber valve body 3 is provided with slots 8 which aid in the flow of the fluids through the valve and which function to clear the valve of any solid particles that may be entrained in the fluids passing therethrough.

A spherical or other shaped valve element 9 of glass or other non-corroding material is disposed in the center portion of the molded valve, and as shown in Fig. 2 the aluminum housing is provided with a clearance 10 and 10a permits expansion of the rubber valve when the latter is subjected to pressure.

A rubber disk 11 is disposed in a cut-out portion 12 of the housing 1 and a metal backing disk 13 is placed against the rubber disk to take up the wear of a screw 14 having a knob 15 by which it may be rotated. When pressure is exerted on the disk 11, the valve body will bulge, as shown at 16, Fig. 3, to a diameter larger than the spherical ball 9, thereby permitting the free flow of the fluid through the valve.

Fig. 4 shows an elevational view of the molded rubber valve body 3 in greater detail, without the spherical ball. Chamber 17 in Fig. 4, with chamfered ends 18, serves as a pocket to keep the spherical ball properly positioned.

In operation the valve is used for sealing against the passage of and for controlling the flow of liquids or gases by the use of the hand adjusting screw which exerts pressure against the valve body and the ball 9. The valve body flexes and expands sideways under pressure to form an opening at each side of the ball, as shown in Fig. 3.

The cut-out portion 10 of the housing 1 permits sufficient sideway expansion of the valve body to provide for an adequate volume of the fluid to flow through the valve. The adjusting screw not only provides for accurate control of the flow, but will maintain the adjusted flow indefinitely, thereby giving the device great utility in gas analysis apparatus or the like.

It is apparent that instead of a unitary housing 1, as shown, a single casting may be utilized to support any number of such valves in multiples where that is convenient in the use of the device.

Although several embodiments of the invention have been herein illustrated and described, it will be evident to those skilled in the art that various modifications may be made in the details of construction without departing from the principles herein set forth.

I claim:

1. A valve structure comprising a supporting housing, a molded resilient valve body disposed in said housing and held against axial displacement therein, said valve body having a central flow passage, a valve disposed in said passage of a size larger than the passage, an adjusting screw for subjecting the valve body to pressure adjacent the valve, said housing being recessed transversely of the line of pressure to permit flexing and distortion of the valve body.

2. A valve structure comprising a housing, a molded resilient valve body disposed in the housing having beaded ends constituting abutments for preventing axial displacement of the valve in said housing, said molded body having a central opening extending the full length thereof, a valve disposed in said opening, the valve being larger in size than said opening, recessed slots formed in the wall of the valve opening in the region of the valve, a screw mounted in the valve housing adapted for engagement with the valve body, said valve housing being recessed to permit expansion of the valve body in a direction transversely of the screw pressure, said valve body being adapted to receive the ends of conduits to connect the same with a source of fluid.

3. A valve structure comprising a housing, a molded valve body disposed therein and secured against axial displacement, said valve body being of a resilient material, such as rubber, and having a central opening constituting a flow passage, a valve of greater dimension than said passage disposed therein, a recess in said housing on one side of the valve body, a screw mounted in the housing in alignment with said recess, a flexible disk for engaging the valve body, a metal disk disposed against said flexible disk, both of said disks being mounted in the recess of the housing, with the metal disk in alignment with and for engagement by said screw, and said housing being further recessed to permit expansion thereof under pressure of the screw.

4. In a valve, a molded resilient rubber body having a central opening extending therethrough, a valve disposed in the opening substantially centrally thereof, said valve being of a size larger than the opening, the wall of the body adjacent the valve portion having slots formed therein which constitute flow passages when the rubber body is pressed against the valve.

GUY H. BURRELL.